(12) United States Patent
Duke et al.

(10) Patent No.: US 7,007,040 B1
(45) Date of Patent: Feb. 28, 2006

(54) METHOD AND APPARATUS FOR STORING AND UPDATING INFORMATION IN A MULTI-CAST SYSTEM

(75) Inventors: Andrew Duke, Franklin, MA (US); George Stephens, Linthicum, MD (US)

(73) Assignee: General Dynamics C4 Systems, Inc., Taunton, MA (US)

( * ) Notice: Subject to any disclaimer, the term of this patent is extended or adjusted under 35 U.S.C. 154(b) by 492 days.

(21) Appl. No.: 10/004,126

(22) Filed: Dec. 4, 2001

(51) Int. Cl.
*G06F 12/00* (2006.01)

(52) U.S. Cl. .............................. 707/200; 707/2; 707/3; 707/100; 707/206; 341/50

(58) Field of Classification Search .................. 707/1, 707/2, 3, 100, 101 R, 102, 103 R, 203, 4, 707/5, 6, 7, 200; 709/203, 231; 341/50
See application file for complete search history.

(56) References Cited

U.S. PATENT DOCUMENTS

| | | | |
|---|---|---|---|
| 4,309,569 A | | 1/1982 | Merkle |
| 4,771,459 A | | 9/1988 | Jansen |
| 4,771,461 A | | 9/1988 | Matyas |
| 4,912,762 A | | 3/1990 | Lee et al. |
| 4,941,176 A | | 7/1990 | Matyas et al. |
| 5,224,163 A | | 6/1993 | Gasser et al. |
| 5,270,712 A | * | 12/1993 | Iyer et al. ............ 341/50 |
| 5,432,852 A | | 7/1995 | Leighton et al. |
| 5,434,919 A | | 7/1995 | Chaum |
| 5,717,757 A | | 2/1998 | Micali |
| 5,717,758 A | | 2/1998 | Micall |
| 5,758,353 A | * | 5/1998 | Marquis ............... 707/201 |
| 5,793,868 A | | 8/1998 | Micali |
| 5,841,865 A | | 11/1998 | Sudia |
| 5,903,651 A | | 5/1999 | Kocher |
| 5,905,799 A | | 5/1999 | Ganesan |
| 5,960,083 A | | 9/1999 | Micali |
| 6,097,811 A | | 8/2000 | Micali |
| 6,125,185 A | | 9/2000 | Boesch |
| 6,212,637 B1 | | 4/2001 | Ohta et al. |
| 6,233,341 B1 | | 5/2001 | Riggins |

OTHER PUBLICATIONS

Bob Briscoe & Ian Fairman, "Nark: Receiver-Based Multicast Non-Repudiation And Key Management", BT Research, Ipswich, England, (rbriscoe/ifairman)@jungle.bt-.co.uk.

David A. McGrew & Alan T. Sherman, "Key Establishment In Large Dynamic Groups Using One-Way Function Trees", Cryptographic Technologies Group, Glenwood, MD, May 20, 1998.

(Continued)

*Primary Examiner*—Shahid Alam
*Assistant Examiner*—Fred Ehichoiya
(74) *Attorney, Agent, or Firm*—Michael J. Bell; Howrey LLP

(57) ABSTRACT

A method and apparatus for storing and updating information in a multicast system is represented by a tree data structure. The method and apparatus defines and populates a set of keys for each node in the tree. The number and content of the set of keys may vary depending on whether a node is an internal node or a leaf node. The method and apparatus can use these keys to update information in some leaves while excluding the information from other leaves. The method and apparatus can analyze the system to determine a minimum number of messages that need to be sent in order to update the information stored in leaves. The method and apparatus then sends the minimum number of messages throughout the system where each message can only be read by a particular subset set of the leaves that have the correct key to read that particular message.

14 Claims, 3 Drawing Sheets

OTHER PUBLICATIONS

Ran Canetti, Juan Garay, Gene Itkis, Daniele Micciancio, Moni Naor & Benny Pinkas, "Multicast Security, A Taxonomy And Some Efficient Constructions", Secure Multicast Group (SmuG), ©1999 iEEE.

Jacques Stern, "Advances In Cryptology—EUROCRYPT '99", International Conference on the Theory and Application of Cryptographic Techniques, Prague, Czech Republic, May 2-6, 1999 Proceedings.

D. Wallner, E. Harder, R. Agee, National Security Agency, "Key Management For Multicast: Issues And Architectures", ©The Internet Society, Jun. 1999.

Dalit Naor, Moni Naor & Jeff Lotspiech, "Revocation And Tracing Schemes For Stateless Receivers", IBM Almaden Research Center and Department of Computer Science and Applied Math, Weizmann Instutute, Feb. 24, 2001.

Dalit Naor, Moni Naor & Jeff Lotspiech, "Revocation And Tracing Schemes For Stateless Receivers", IBM Almaden Research Center, San Jose, CA and Department of Computer Science and Applied Math, Weizmann Instutute, Rehovot, Israel, Jul., 2001.

Dalit Naor, Moni Naor & Jeff Lotspiech, "Revocation And Tracing Schemes For Stateless Receivers", Advances In Cyptology—CRYPTO 2001, 21st Annual International Cyptology Conference, Santa Barbara, CA, Aug. 19-23, 2001 Proceedings.

* cited by examiner

METHOD AND APPARATUS FOR STORING AND UPDATING INFORMATION IN A MULTI-CAST SYSTEM

BACKGROUND OF THE INVENTION

1. Field of the Invention

The present invention relates to a method and apparatus for updating and storing information in a multi-cast system and, more particularly, to using a redundant path tree to minimize the number of messages that need to be sent to update users with changes to the system.

2. Description of the Related Art

One-way communication has always served a fundamental role in society. One-way communication allows one party to send messages or information to one or more receiving parties. An example of one-way communication is subscription television service, wherein a broadcaster sends its content to many customers.

Subscription television typically is a fee-based service. Therefore, a subscription television system operator wants to ensure that only paying customers receive its signal. A broadcaster could effect a secure system wherein only paying customers can use the service by maintaining its own network and physically adding or removing user connections, but such a system would be unduly burdensome and impractical to implement. A popular alternative is the use of encryption as a means for providing secure transmissions. Using encryption, a broadcaster can use its own equipment or a public network to send information. Any person with access to the network would be able to receive the encrypted signal, but would require a key to decipher the encrypted signal. The broadcaster provides keys to only the authorized users. Although an unintended recipient may receive the signal, the signal typically would be useless without the appropriate key.

Encrypting signals creates additional challenges for the broadcaster. The broadcaster needs a way to manage, update, or change keys every time there is a change to the intended group of recipients, e.g. whenever customers are added or deleted. Otherwise, an unauthorized recipient could still decrypt the signal. One solution would be for the broadcaster to send new keys to each authorized customer each time the group of authorized recipients is altered. This solution would require the broadcaster to send a unique message including new keys to each customer. For a system of n users, this would require the broadcaster to send n messages to update the system. Unauthorized users would not receive new keys and thus would not be able to decrypt signals. This system may be practical where there is a relatively small number of authorized users. However, as the list of authorized users grows, it can become very burdensome to send a new key to each authorized user every time the system needs to be updated.

To solve this problem, many broadcasters use a multi-cast system wherein a single message sent by the broadcaster is received by many users. This type of system may be helpful in reducing the number of messages that the broadcaster needs to send when the system is updated. With a conventional multi-cast system, it is possible to implement a method such as linear key hierarchy. As shown in FIG. 1, this method is based on a balanced binary tree 100. A balanced tree is a tree wherein each node has the same number of children. A balanced binary tree is a tree wherein each node has exactly two children. Root 110 of tree 100 represents the server (broadcaster), and each leaf 160–167 represents a user (customer). An authorized user would hold the keys associated with each node on the path from the root to that user. To change a key for a select group of users, the server would select a set of subtrees of the main tree that contain only those users. As shown in FIG. 2, the nodes of the tree that are on the paths from the root to the select group of users are referred to as the common ancestor tree nodes for those users.

When the broadcaster no longer wants a certain user to be able to decrypt the signal, the server must replace each key that the user held. Users who no longer are authorized recipients are referred to as compromises. New keys must be delivered to each of the authorized users in the system. When the server wants to exclude one user, the number of messages that must be sent to deliver the new keys is on the order of d, where d is the depth of the tree. In addition, some authorized users might not receive the initial update signal, so additional messages must be sent to ensure that the authorized users are properly updated and not erroneously treated as compromises. This is known as the late entry problem. As the number of updates increases, so does the number of late entries. If k updates are needed for a tree of depth d, approximately d*k update messages are sent.

Even though a multi-cast system greatly reduces the number of messages needed when compared with a uni-cast system, reducing the number of messages from n to log(n) (where n equals the number of users), it can still be very burdensome. Not only are some one-way communications systems very complex, they also may need to be rapidly changed and updated.

A large communication system may not be able to update its keys fast enough to provide adequate service to its customers while stopping unauthorized recipients from using proprietary information. The number of messages needed can grow exponentially with the number of users. Even though methods such as linear key hierarchy and others known in the art are an improvement over uni-cast systems, there is a need to further reduce the number of messages that must be sent when updating a system.

There are methods known in the art for reducing the number of messages that a server sends to update its network. Many of these other methods may specialize in certain types of services or networks of certain sizes. In other words, a particular method may only work well for a certain number of users or a network configured in a certain way. Even with all of these other methods, there still exists a need for a more efficient and practical method that can further reduce the number of messages sent and minimize the cost of dealing with late entries. Additionally, it would be desirable for any new method to work uniformly well, regardless of the size or type of network used.

SUMMARY OF THE INVENTION

The present invention is a method and apparatus for delivering information from a single source, such as a server, to multiple destinations in a system. Generally, the present invention reduces the number of messages the server must send to update information in the system, compared to known systems. The present invention is an advance over conventional methods such as linear key hierarchy. The present invention uses the data structure of a tree to organize the delivery of information. While conventional methods typically use a balanced binary tree, the present invention works well with binary trees and trees with more than two children per node because it does not need to rely on the unique properties of a binary tree. The ability to increase the number of children per node can reduce the overall depth of the tree. With a shorter tree, according to the present invention, the number of messages needed to update the nodes can be reduced.

In addition to manipulating the tree structure, the present invention also changes the amount and type of information that each node stores. Specifically, the present invention stores more keys at each node than conventional methods. When a node is compromised, not all of the compromised keys need to be replaced. Instead, the server no longer uses the compromised keys when sending out information. The server can use one of the many other keys held by authorized users that are not held by unauthorized users to deliver subsequent information. Because there are multiple ways to deliver information to the authorized users, this type of structure is referred to as a redundant path tree.

When a user is compromised, the server no longer uses the keys that the compromised user held. Using this method, updating the system requires fewer messages. The present invention is effective regardless of whether it is updating the system for a single compromise or a group of compromises. Furthermore, when compared to conventional methods, the present invention reduces the number of messages needed to remedy late entries. Also, the present method is more effective because it may be used with a variety of different systems, including systems in which gross variations in the number of users are encountered.

In short, the present invention constructs an m-ary tree to manage the information sent through a multi-cast system. An m-ary tree is a tree wherein the maximum number of children per node is m. In a preferred embodiment, the root of the tree is the server. The server sends out its signal encrypted with a master key. Every authorized user has a copy of the master key to decrypt the signal. When the server no longer wishes a particular user to decrypt messages, it stops using that particular master key. The server sends update messages containing a new master key to the authorized users. Each update message is encrypted with a secondary key. Each non-leaf node in the tree has a set of secondary keys defined such that each secondary key corresponds to one of the possible subsets of children of the node. Each leaf (user) has a set of keys associated with each node on the path from the leaf to the root. Before an authorized user can use a new master key, the server must send a copy of the new master key to the authorized users. The server will use the secondary keys associated with only the authorized users to encrypt messages that contain the new master key. Because the no-longer authorized uses do not have the appropriate secondary key, they cannot decrypt the message to receive the new master key. The server typically will determine the minimum number of messages it needs to send to update the system by analyzing the secondary keys associated with the authorized users. The server will send these messages, and the system will be updated with the new master key.

DETAILED DESCRIPTION OF THE PREFERRED EMBODIMENT

The present invention is a method and apparatus for delivering and updating information in a system using fewer communications than used by conventional methods. In a preferred embodiment, the present invention is implemented in a secure multi-cast system that sends an encrypted signal to many users. In order for an authorized user to decrypt the signal, that user needs to have the appropriate traffic encryption key ("TEK"). A user who is no longer deemed an authorized user is referred to as a compromise. Each time a compromise is identified, the server typically will transition to a different TEK so that the compromise's TEK can no longer decrypt the signal. Key encryption keys ("KEK") are stored by each node and are used to encrypt signals containing keys. In particular, KEKs are used to deliver a new TEK to the authorized users in the system. To accomplish this task, the server will send a number of messages through the system to update the authorized users with a new TEK. In a preferred embodiment, the system uses a common TEK for all authorized users, but the system may use many KEKs to update the authorized users with a new common TEK. In the present invention, the use of KEKs in the system dictates the number and manner in which the update messages will be sent.

1. Tree Structure

The root and leaves of a tree are specific types of nodes that have special properties. The root is a node without a parent node, and the leaves are nodes that do not have any child nodes. Internal nodes have both a parent and children, i.e. they are nodes that are neither a root nor a leaf. Although this invention will work with most types of trees, the preferred embodiment uses an m-ary tree, where m is the maximum number of children per node. The "depth" of a tree is the maximum number of levels in that tree. The root is at level zero. The level of any other node is numbered one plus the level of its parent.

Figure 1:
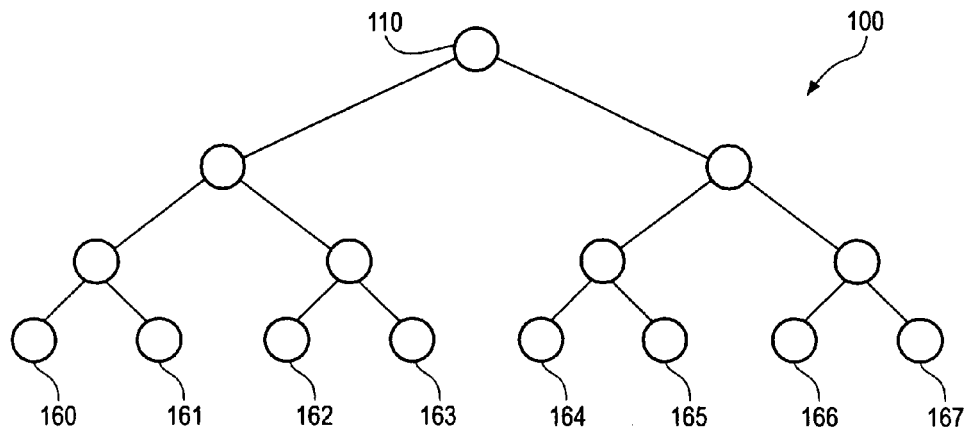
FIG. 1 is a schematic diagram of a prior art balanced binary tree.
Figure 2:
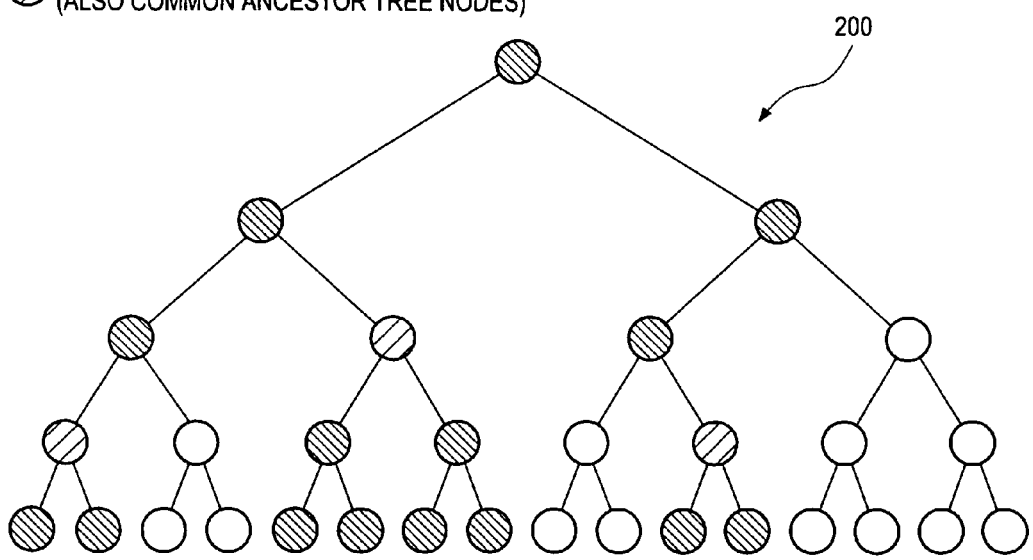
FIG. 2 is a schematic diagram of a prior art common ancestor tree.
Figure 3:
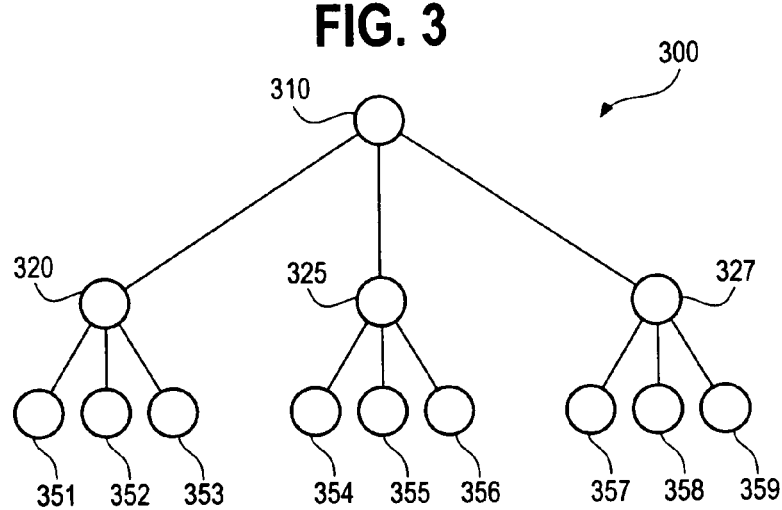
FIG. 3 is a schematic diagram of a redundant path tree.

As illustrated in FIG. 3, tree 300 is an m-ary tree where m equals three, meaning that each node can have at most three children. Tree 300 has a depth of two. A tree can have more or fewer than three children per node, but three or more children per node is preferred. By using three or more children per node, the overall depth, d, of the tree is less than that of a binary tree with an equal number of users. Generally, the shallower the tree, the lower the number of messages needed to react to a compromise.

In a preferred embodiment, the tree is initially constructed as a balanced tree (i.e. all nodes have the same number of children, preferably the maximum). Root 310 of the tree represents the server, which distributes the signal, and each leaf, 351–359, represents a user. The internal nodes, e.g. nodes 320, 325, and 327, do not correspond to any physical device. The internal nodes are abstractions which facilitate information processing. Physically, messages are sent directly from root 310 to leaves 351–359. Where m is the maximum number of children per node and d is the depth of the tree, the maximum number of users that the present invention typically could serve would be $m^d$.

2. Key Definition

A preferred embodiment of the present invention also defines a set of KEKs for each non-leaf node. Each key in a set of KEKs associated with a non-leaf node is held by one of the subsets of the corresponding node's children. The total number of KEKs associated with an internal node is usually $2^m-1$. However, one common KEK typically is held by all of the node's children. Because this common KEK may not be necessary in certain embodiments, the nodes in such embodiments might use only $2^m-2$ KEKs. A leaf holds all of the KEKs associated with that leaf for all of the nodes on the path from that leaf to the root. In general, for a tree of depth d, a leaf would hold $d*(2^{m-1}-1)$ KEKs. In this embodiment of the present invention, there are multiple ways to deliver a TEK to the users. Accordingly, this type of structure is referred to as a redundant path tree.

Referring to FIG. 3, internal nodes 320, 325, and 327 and root 310 would each have six keys. For example, root 310 would have three KEKs, one known by each internal node (i.e., internal nodes 320, 325, and 327). In addition, root 310 would have three more KEKs known by a combination of its children: one known by node 320 and node 325, another known by node 325 and node 327, and yet another known by node 320 and node 327. In addition, each user would know of every key on the path from that user to the root. Conceptually, root 310 could have a KEK known by all of its children, but that KEK typically would not be effective in dealing with a compromise. However, a KEK known by all the children may have alternative uses within the system other than handling a compromise.

Each authorized user in FIG. 3 would typically have six KEKs. For example, user 351 would have the following KEKs: the KEK known individually by internal node 320; the KEK known jointly by nodes 320 and 325; the KEK known jointly by nodes 320 and 327; the KEK known jointly by users 351 and 352; the KEK known jointly by users 351 and 353; and, finally, the KEK known individually by user 351.

In addition to the KEKs defined in the tree, root 310 typically uses a common TEK for all the authorized users. The TEK is used to encrypt and decrypt the main traffic sent by root 310. For security purposes, when a user is compromised, the TEK used by the system typically is changed. Root 310 will send one or more messages with each message encrypted by a different KEK, but each message typically will contain the same TEK. The number of messages sent and the KEKs used will determine which users receive the new common TEK. Even though each node has many KEKs, only one of its KEKs will be used to decrypt the signal with the new common TEK.

3. Updating Information

When root 310 needs to update the TEK, it will determine the minimum number of messages it needs to send by identifying the common ancestor tree nodes for the authorized users. When a set of authorized users shares a common KEK not held by a compromised user, root 310 can send the TEK to that set of authorized users in a single message, encrypted in a single KEK. Root 310 typically will find the largest set of users that can use the same KEK. For example, assume user 351 becomes a compromise. Internal nodes 325 and 327 and their descendent users would all have at least one KEK in common that the compromised user 351 does not have. Thus, root 310 can use that one common KEK to encrypt a message containing a new TEK that only users 354–359 could decrypt. Root 310 would have to send individual update messages to each of users 352 and 353 because the KEK they have in common with users 354–359 is also known by compromised user 351. Ordinarily, root 310 would send just enough encrypted messages to ensure that the remaining authorized users will receive the new TEK.

The maximum number of messages that must be sent equals the number of compromises multiplied by d, the depth of the tree. However, because many nodes share some KEKs and the same compromised KEKs, when several compromises are to be dealt with at one time, the required number of messages is likely to be less than the maximum. The server determines the number of messages needed by analyzing the common ancestor tree nodes. A single message can update those authorized users who share a common ancestor tree node that is not shared by a compromise. Accordingly, the server will find the common ancestor tree nodes that have the greatest number of users that do not contain a compromise. In other words, the server will find the highest (i.e., closest to the root) common ancestor tree node that leads only to authorized users, and use a key from that node to reach those authorized users. By using the common ancestor tree nodes approach, the server typically can quickly determine the minimum number of messages that need to be sent to update the system.

Expanding on the previous example, assume that first user 351 and then user 353 are compromised. If root 310 were used to update the system after each such compromise, it would need to send four messages. That is, when user 351 became compromised, root 310 would send one message to update users 354–359 and another message to update users 352–353. Then, when user 353 became compromised, root 310 would send a third message to update users 354–359 and a fourth message to update user 352. However, if root 310 were to handle both compromises at the same time, only two messages would need to be sent. One message would update users 354–359 with the new common TEK and another message would update user 352 with the new common TEK. In the present invention, handling more than one compromise at a time can reduce the number of messages because the KEKs at each node do not necessarily change with each compromise and because more KEKs are available to reach various sets of users.

As compromises continue to occur, paths through the tree typically are pruned because compromises are no longer a valid part of the system. According to the present invention, when a compromise occurs, the system need not replace all of the KEKs held by an authorized user; instead, only the TEK needs to be replaced. Unlike conventional methods, the contents of the entire tree typically do not change with each compromise. Because the present invention does not change the entire content of the tree when a compromise occurs, late entries do not need to receive all the previously sent update messages. Late entries typically need to receive only the last group of messages containing the most recent TEK in order to receive service. For example, if a user misses three update messages for three different TEKs, the user would only have to receive the message with the latest TEK to decrypt future signals. Typically, using conventional methods, all of the previous messages would have been received and implemented in order to update the user with the changes to the content of the tree before the latest message could be properly received and implemented. Accordingly, the present invention uses fewer messages to resolve late entries when compared with conventional methods.

In a preferred embodiment, the number of messages required to react to multiple compromises, occurring either singularly or as a group, typically is much lower when compared with conventional methods. The number of messages the server needs to send varies depending on the relative location and number of compromises. The number of messages sent typically will be between one and $m^{d-1}$. If m is greater than two, the number of messages sent will be less than that required for a binary tree. As m increases, the number of messages the server needs to send decreases, but the complexity of the system increases. As discussed above, each user typically has to store $d*(2^{m-1}-1)$ KEKs. If m is very large, each user will have to be able to store a large number of keys.

4. Updating the Tree

Figure 4:
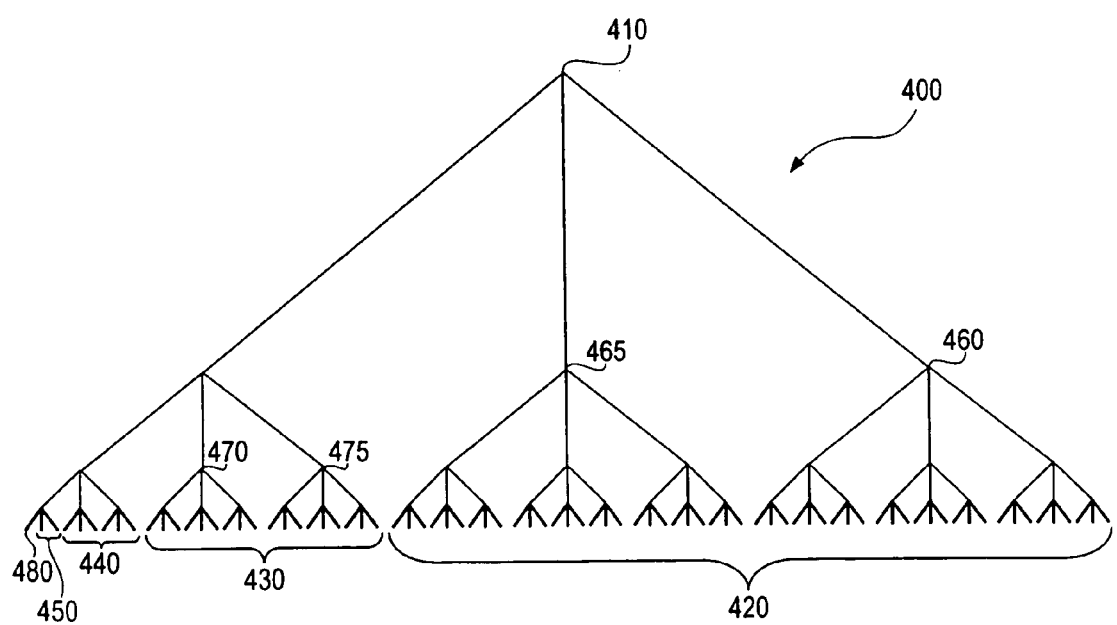
FIG. 4 is a schematic diagram of a redundant path tree with one compromise.

FIG. 4 illustrates a balanced tree 400 having a depth of four (d=4) and wherein each node has three children (m=3). Because the depth of the tree 400 is four, the server usually only needs to send four different messages to update the authorized users in response to a single compromise. FIG. 4 shows one compromise, specifically compromised user 480. In order to update the system, every authorized user will need a new common TEK. The new common TEK is delivered by using the KEKs known by the non-compromised nodes. Users 420 share only one KEK with compromised user 480. Therefore, only one message typically needs to be sent to replace the TEK for users 420. In other words, root 410 can send a message encrypted by a common KEK known by users 420 and not known by compromised user 480. Users 430, 440, and 450 cannot use the message sent to users 420 because the only KEK they have in common with users 420 is also known by the compromised user 480.

This pattern repeats until all of the users are updated with a new common TEK. Each group of users 430, 440, and 450 have at least one common KEK among them not known by compromised user 480. Users 430, 440 and 450 cannot use the same message because the KEKs they have in common are also known by compromised user 480. However, root 410 can send three update messages with a new common TEK each encrypted by a KEK that is known only by users 430, 440, and 450, respectively. As discussed, each message is formatted in such a way and has the necessary information to allow only its intended recipients to update those recipients' TEK.

Figure 5:
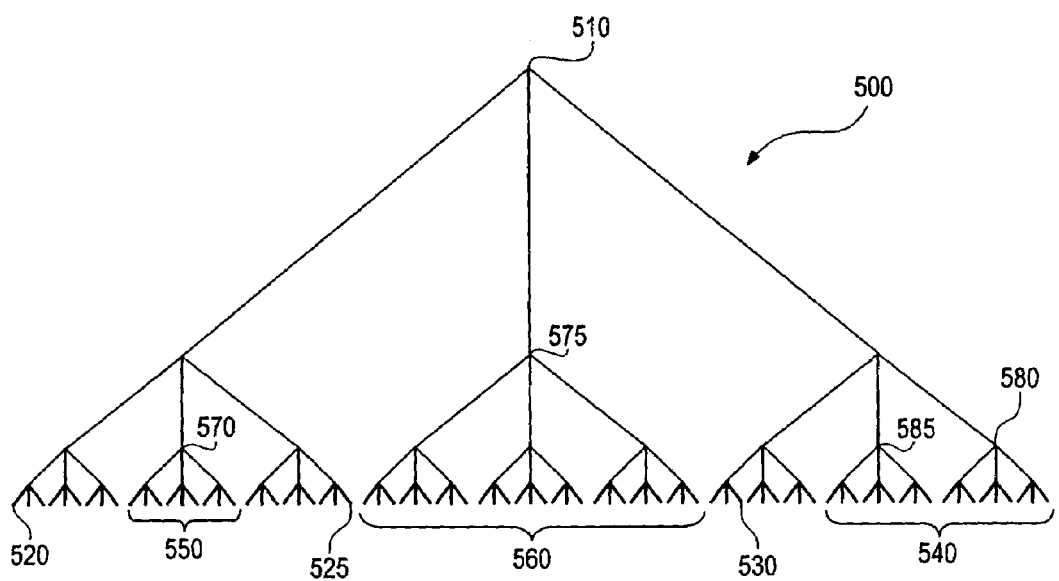
FIG. 5 is a schematic diagram of a redundant path tree with three compromises.

The reduction in the number of messages that must be sent according to the present invention when compared with conventional methods is most noticeable when more than one compromised key is being replaced at the same time. See FIG. 5, which shows a balanced tree 500 having a depth of four (d=4) and wherein each node has three children (m=3). FIG. 5 shows three compromised users, specifically users 520, 525, and 530. In order to update the system, each authorized user must receive a new common TEK. Users 560 that share only one common KEK with the compromises will receive a new TEK via a single message encrypted with a KEK known only by users 560. For example, a KEK only known by node 575 and its descendants can be used to replace the TEK for users 560. Users who do not have a KEK in common with users 560 will receive the new TEK via other messages encrypted with KEKs known only to those users. However, in order for a set of users to be able to use the same update message, they must have more in common than the same number of compromised KEKs; they also must share a common KEK not held by any compromise.

In FIG. 5, users 540, each share at least one KEK not known by compromises 520, 525, or 530. Thus, users 540 can use the same message encrypted by the KEK to replace the common TEK. Users 550 also each share at least one KEK not known by compromises 520, 525, or 530. However, any KEK common to both users 540 and 550 usually will also be common to at least one of compromises 520, 525, or 530. Thus, users 540 and 550 will not be able to use the same KEK to update the new common TEK. Root 510 will have to send two different messages, each encrypted with a different KEK—one to update users 540 and another message to update users 550. In this example, the message sent to update users 540 could use a KEK known only by node 580, node 585, and their descendant users, and the message sent to update users 550 could be a KEK known only by node 570 and its descendant users.

Through analysis of relative location, number of compromises, and the common ancestor tree nodes of the remaining authorized users, the server can determine the minimum number of messages it needs to send. Theoretically, the server could send a different message for each of the remaining authorized users. However, it is more likely that the present invention will use less than the theoretical maximum. For example, because the depth of tree 500 is four, as shown in FIG. 5, four different messages can be sent to properly update the authorized users in response to a single compromise. When the server responds to multiple compromises, fewer than four messages per compromise might be needed. Generally, the higher in the tree (i.e. closer to the root) a common ancestor tree node can be found for a set of authorized users, the lower the number of messages are needed to response to a compromise. For example, node 575, which is a common ancestor tree node for users 560, is at a higher level than node 570, which is a common ancestor tree node for users 550. Thus, by using a KEK known only by node 575 and users 560, server 510 will be able to update a greater number of users, twenty-seven, in a single message than if it were to use a common ancestor tree node located in a lower level, such as node 570 which would only update nine users. The server determines which groups of authorized users share a parent node with a group of compromised users. Each group of authorized users that share a parent node with a group of compromised users can use a key from a non-shared parent or its own unique key to receive a message. In the FIG. 5 example, only nine messages (instead of twelve or more messages) were used to update the system after three compromises.

In a preferred embodiment, compromised KEKs are not re-used. Thus, the need to schedule a system wide KEK replacement typically depends on the number of compromises that have occurred in the system. Once the need arises, every KEK in the tree should be replaced. Typically, the KEKs should be replaced on a schedule consistent with their use. The more often a system reacts to compromises, the sooner the KEK replacement should be done. The manner and scheduling of the replacement of the KEKs in a tree is outside the scope of this invention.

In an alternative embodiment of the present invention, it may be desirable for security or other reasons to occasionally refresh all of the KEKs in the system. At a predetermined time, depending on system usage, size, and the amount of updates, the system would replace every KEK in the tree using an out of band method as would be known to one skilled in the art.

Thus, there has been described a novel method for storing and updating information in a multi-cast system. The present invention focuses on a system that uses a tree data structure to manage information. The information stored and updated can be virtually anything. In addition, a specific embodiment was described where a TEK was needed to decrypt a signal from a server. Different KEKs are associated with each node. When a TEK is to be replaced, this specific embodiment used the KEKs to deliver the new TEK to only those users who are intended recipients. In this embodiment, the TEK is updated whenever a user is to no longer to be able to use the signal but is still part of the physical system. In addition, the present invention works well on a variety of systems of different types and sizes. By changing how keys are stored, used, and sent, the present invention reduces the number of messages needed to update the system, compared to over conventional methods.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A computer implemented method for storing and updating information in a network having n hierarchical levels, said method comprising the steps of:
    defining a root node positioned in a first of said levels, said root node having no parent node and at least one child node;
    defining at least two leaf nodes positioned within an nth of said hierarchical levels, each of said leaf nodes having a parent node and no child node;
    defining a corresponding path between each of said at least two leaf nodes and said root node;
    associating each non-leaf node with a corresponding set of keys wherein each key in said corresponding set of keys further corresponds to at least one child node of said non-leaf node; and
    providing each leaf node with a related set of keys, wherein said related set of keys includes each key associated with each non-leaf node on said corresponding path from said leaf node to said root node wherein said corresponding set of keys associated with each non-leaf node includes $2^m-1$ keys where m is the maximum number of child nodes that may be associated with each non-leaf node.

2. The method of claim 1 wherein each non-leaf node is associated with more than two child nodes.

3. The method of claim 1 wherein each non-leaf node is associated with the same number of child nodes.

4. The method of claim 1 further comprising the step of defining an internal node positioned on said corresponding path between said root node and a first of said leaf nodes, said internal node being associated with a hierarchal level between said first level and said nth level.

5. The method of claim 1 further comprising the step of identifying a specific one of said leaf nodes as a compromised leaf node.

6. The method of claim 5 further comprising the step of removing at least a portion of said corresponding path associated with said compromised leaf node.

7. The method of claim 5 comprising the step of marking a key in said set of keys related to said compromised leaf node as a compromised key.

8. The method of claim 7 further comprising the step of sending a message from said root node to a non-compromised leaf node using a key that has not been marked as a compromised key.

9. The method of claim 1 further compromising the step of identifying each of one or more specific leaf nodes as a compromised leaf node.

10. The method of claim 9 further compromising the step of removing at least a portion of said path between each of said one or more compromised leaf nodes and said root node.

11. The method of claim 9 further comprising the step of marking a key in said set of keys related to each of said one or more compromised leaf nodes as a compromised key.

12. The method of claim 11 further comprising the step of sending a message from said root node to a non-compromised leaf node using a key that has not been marked as a compromised key.

13. A computer implemented method for storing and updating information in a network having n hierarchical levels, said method comprising the steps of:
    defining a root node positioned in a first of said levels, said root node having no parent node and at least one child node;
    defining at least two leaf nodes positioned within an nth of said hierarchical levels, each of said leaf nodes having a parent node and no child node;
    defining a corresponding path between each of said at least two leaf nodes and said root node;
    associating each non-leaf node with a corresponding set of keys wherein each key in said corresponding set of keys further corresponds to at least one child node of said non-leaf node; and
    providing each leaf node with a related set of keys, wherein said corresponding set of keys associated with each non-leaf node includes $2^m-2$ keys where m is the maximum number of child nodes that may be associated with each non-leaf node.

14. A computer implemented method for storing and updating information in a network having n hierarchical levels, said method comprising the steps of:
    defining a root node positioned in a first of said levels, said root node having no parent node and at least one child node;
    defining at least two leaf nodes positioned within an nth of said hierarchical levels, each of said leaf nodes having a parent node and no child node;
    defining a corresponding path between each of said at least two leaf nodes and said root node;
    associating each non-leaf node with a corresponding set of keys wherein each key in said corresponding set of keys further corresponds to at least one child node of said non-leaf node; and
    providing each leaf node with a related set of keys, wherein said related set of keys provided to each leaf node includes $(n-1)*(2^m-1)$ keys where m is the maximum number of child nodes that may be associated with each non-leaf node.

* * * * *